(12) United States Patent
Wei et al.

(10) Patent No.: US 11,792,791 B2
(45) Date of Patent: Oct. 17, 2023

(54) UTILIZATION OF A CONTROL REGION FOR DOWNLINK TRANSMISSION

(71) Applicant: QUALCOMM Incorporated, San Diego, CA (US)

(72) Inventors: Chao Wei, Beijing (CN); Alberto Rico Alvarino, San Diego, CA (US); Le Liu, Fremont, CA (US); Ayan Sengupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 17/250,450

(22) PCT Filed: Jul. 17, 2019

(86) PCT No.: PCT/CN2019/096288
§ 371 (c)(1),
(2) Date: Jan. 22, 2021

(87) PCT Pub. No.: WO2020/020024
PCT Pub. Date: Jan. 30, 2020

(65) Prior Publication Data
US 2021/0307041 A1 Sep. 30, 2021

(30) Foreign Application Priority Data

Jul. 23, 2018 (WO) ............... PCT/CN2018/096595

(51) Int. Cl.
*H04W 72/1273* (2023.01)
*H04W 4/70* (2018.01)
*H04W 72/23* (2023.01)

(52) U.S. Cl.
CPC ......... *H04W 72/1273* (2013.01); *H04W 4/70* (2018.02); *H04W 72/23* (2023.01)

(58) Field of Classification Search
CPC ............... H04W 72/1273; H04W 4/70; H04W 72/1289; H04W 48/12; H04L 5/0064;
(Continued)

(56) References Cited

U.S. PATENT DOCUMENTS 9,510,132 B2 11/2016 Xu et al.
10,098,144 B2 10/2018 John et al.
(Continued)

FOREIGN PATENT DOCUMENTS

CN 102340371 A 2/2012
CN 106160987 A 11/2016
(Continued)

OTHER PUBLICATIONS

International Search Report and Written Opinion—PCT/CN2018/096595—ISA/EPO—dated Apr. 24, 2019.
(Continued)

*Primary Examiner* — Sharmin Chowdhury
(74) *Attorney, Agent, or Firm* — Harrity & Harrity, LLP

(57) ABSTRACT

Various aspects of the present disclosure generally relate to wireless communication. In some aspects, a base station (BS) may transmit, and an enhanced machine-type communications (eMTC) user equipment (UE) may receive, an indicator indicating use of a control region of a carrier for a downlink transmission. The BS may transmit and the eMTC UE may receive, based at least in part on the indicator, the downlink transmission during the control region of the carrier. Numerous other aspects are provided.

50 Claims, 16 Drawing Sheets

(58) Field of Classification Search
CPC ... H04L 5/0094; H04L 5/0007; H04L 5/0044; H04L 5/0092; H04L 5/0053
See application file for complete search history.

(56) References Cited

U.S. PATENT DOCUMENTS

| | | | |
|---|---|---|---|
| 2013/0114587 A1 | 5/2013 | Khoryaev et al. | |
| 2013/0301552 A1* | 11/2013 | Xu | H04W 4/70 370/329 |
| 2016/0219601 A1 | 7/2016 | Lin et al. | |
| 2016/0338018 A1* | 11/2016 | Awad | H04L 5/0053 |
| 2017/0180086 A1 | 6/2017 | Xiong et al. | |
| 2018/0035329 A1* | 2/2018 | Futaki | H04W 28/06 |
| 2018/0115943 A1 | 4/2018 | Park et al. | |
| 2018/0375636 A1* | 12/2018 | You | H04L 5/0092 |
| 2019/0320306 A1* | 10/2019 | Urabayashi | H04L 5/001 |
| 2020/0328845 A1* | 10/2020 | Sundberg | H04L 5/0053 |
| 2021/0227511 A1* | 7/2021 | Solano Arenas | H04L 5/0082 |
| 2021/0250916 A1* | 8/2021 | Mu | H04W 72/23 |

FOREIGN PATENT DOCUMENTS

| | | |
|---|---|---|
| CN | 107733607 A | 2/2018 |
| CN | 107734606 A | 2/2018 |
| EP | 3940985 A1 | 1/2022 |
| WO | 2013169468 A1 | 11/2013 |
| WO | 2017058483 A1 | 4/2017 |
| WO | 2018016848 A1 | 1/2018 |
| WO | 2018064586 | 4/2018 |
| WO | WO-2018136624 A1 | 7/2018 |
| WO | WO-2018169637 A1 | 9/2018 |

OTHER PUBLICATIONS

International Search Report and Written Opinion—PCT/CN2019/096288—ISA/EPO—dated Oct. 17, 2019.
Qualcomm Incorporated: "Remaining Issues foreMTC", 3GPP Draft, R1-164402, 3GPP TSG RAN WG1 Meeting #85, Remaining Issues for EMTC, 3rd Generation Partnership Project (3GPP), Mobile Competence Centre, 650, Route Des Lucioles, F-06921, Sophia-Antipolis Cedex, France, vol. RAN WG1, No. Nanjing, China, May 23, 2016-May 27, 2016, May 14, 2016 (May 14, 2016), XP051089990, pp. 1-4, Retrieved from the Internet: URL: http://www.3gpp.org/ftp/tsg_ran/WG1_RL1/TSGR1_85/Docs/[retrieved on MAy 14, 2016] Sects 1, 5.3.4.
Supplementary European Search Report—EP19840543—Search Authority—The Hague—dated Mar. 29, 2022.
Taiwan Search Report—108125788—TIPO—dated Aug. 11, 2022.

* cited by examiner

FIG. 9D

UTILIZATION OF A CONTROL REGION FOR DOWNLINK TRANSMISSION

CROSS-REFERENCE TO RELATED APPLICATIONS

This application is a 371 national stage of PCT Application No. PCT/CN2019/096288 filed on Jul. 17, 2019, entitled "UTILIZATION OF A CONTROL REGION FOR DOWNLINK TRANSMISSION," which claims priority to Patent Cooperation Treaty (PCT) Patent Application No. PCT/CN2018/096595, filed on Jul. 23, 2018, entitled "UTILIZATION OF A CONTROL REGION FOR DOWNLINK TRANSMISSION," which are hereby expressly incorporated by reference herein.

TECHNICAL FIELD OF THE DISCLOSURE

Aspects of the technology described below generally relate to wireless communication, and more particularly to techniques and apparatuses for utilization of a control region for downlink transmission. Some techniques and apparatuses described herein enable and provide wireless communication devices and systems configured for narrowband bandwidth scenarios and enhanced network coverage for enhanced machine-type communications (eMTC) user equipment (UEs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. The sole purpose of this summary is to present some concepts of one or more aspects of the disclosure in summary form as a prelude to the more detailed description that is presented later.

In some aspects, a method of wireless communication, performed by an enhanced machine-type communications (eMTC) user equipment (UE), may include receiving an indicator indicating use of a control region of a carrier for a downlink transmission; determining a backward compatible resource element mapping for the downlink transmission based at least in part on receiving the indicator; and receiving, based at least in part on the backward compatible resource element mapping, the downlink transmission during the control region of the carrier.

In some aspects, an eMTC UE for wireless communication may include memory and one or more processors operatively coupled to the memory. The memory and the one or more processors may be configured to receive an indicator indicating use of a control region of a carrier for a downlink transmission; determine a backward compatible resource element mapping for the downlink transmission based at least in part on receiving the indicator; and receive, based at least in part on the backward compatible resource element mapping, the downlink transmission during the control region of the carrier.

In some aspects, a method of wireless communication, performed by a base station (BS), may include transmitting, to an eMTC UE, an indicator indicating use of a control region of a carrier for a downlink transmission, wherein the indicator is associated with identifying a backward compatible resource element mapping for the downlink transmission; and transmitting, based at least in part on transmitting the indicator and in accordance with the backward compatible resource element mapping, the downlink transmission during the control region of the carrier.

In some aspects, a BS for wireless communication may include memory and one or more processors operatively coupled to the memory. The memory and the one or more processors may be configured to transmit, to an eMTC UE, an indicator indicating use of a control region of a carrier for a downlink transmission, wherein the indicator is associated with identifying a backward compatible resource element mapping for the downlink transmission; and transmit, based at least in part on transmitting the indicator and in accordance with the backward compatible resource element mapping, the downlink transmission during the control region of the carrier.

In some aspects, a non-transitory computer-readable medium may store one or more instructions for wireless communication. The one or more instructions, when executed by one or more processors of an eMTC UE, may cause the one or more processors to: receive an indicator indicating use of a control region of a carrier for a downlink transmission; determine a backward compatible resource element mapping for the downlink transmission based at least in part on receiving the indicator; and receive, based at least in part on the backward compatible resource element mapping, the downlink transmission during the control region of the carrier.

In some aspects, a non-transitory computer-readable medium may store one or more instructions for wireless communication. The one or more instructions, when executed by one or more processors of a BS, may cause the one or more processors to: transmit, to an eMTC UE, an indicator indicating use of a control region of a carrier for a downlink transmission, wherein the indicator is associated with identifying a backward compatible resource element mapping for the downlink transmission; and transmit, based at least in part on transmitting the indicator and in accordance with the backward compatible resource element mapping, the downlink transmission during the control region of the carrier.

In some aspects, an apparatus for wireless communication may include means for receiving an indicator indicating use of a control region of a carrier for a downlink transmission; means for determining a backward compatible resource element mapping for the downlink transmission based at least in part on receiving the indicator; and means for receiving, based at least in part on the backward compatible resource element mapping, the downlink transmission during the control region of the carrier.

In some aspects, an apparatus for wireless communication may include means for transmitting, to an eMTC UE, an indicator indicating use of a control region of a carrier for a downlink transmission, wherein the indicator is associated with identifying a backward compatible resource element mapping for the downlink transmission; and means for transmitting, based at least in part on transmitting the indicator and in accordance with the backward compatible resource element mapping, the downlink transmission during the control region of the carrier.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 9A-9E are diagrams illustrating an example of utilization of a control region for a downlink transmission, in accordance with various aspects of the present disclosure.

DETAILED DESCRIPTION

Figure 1:
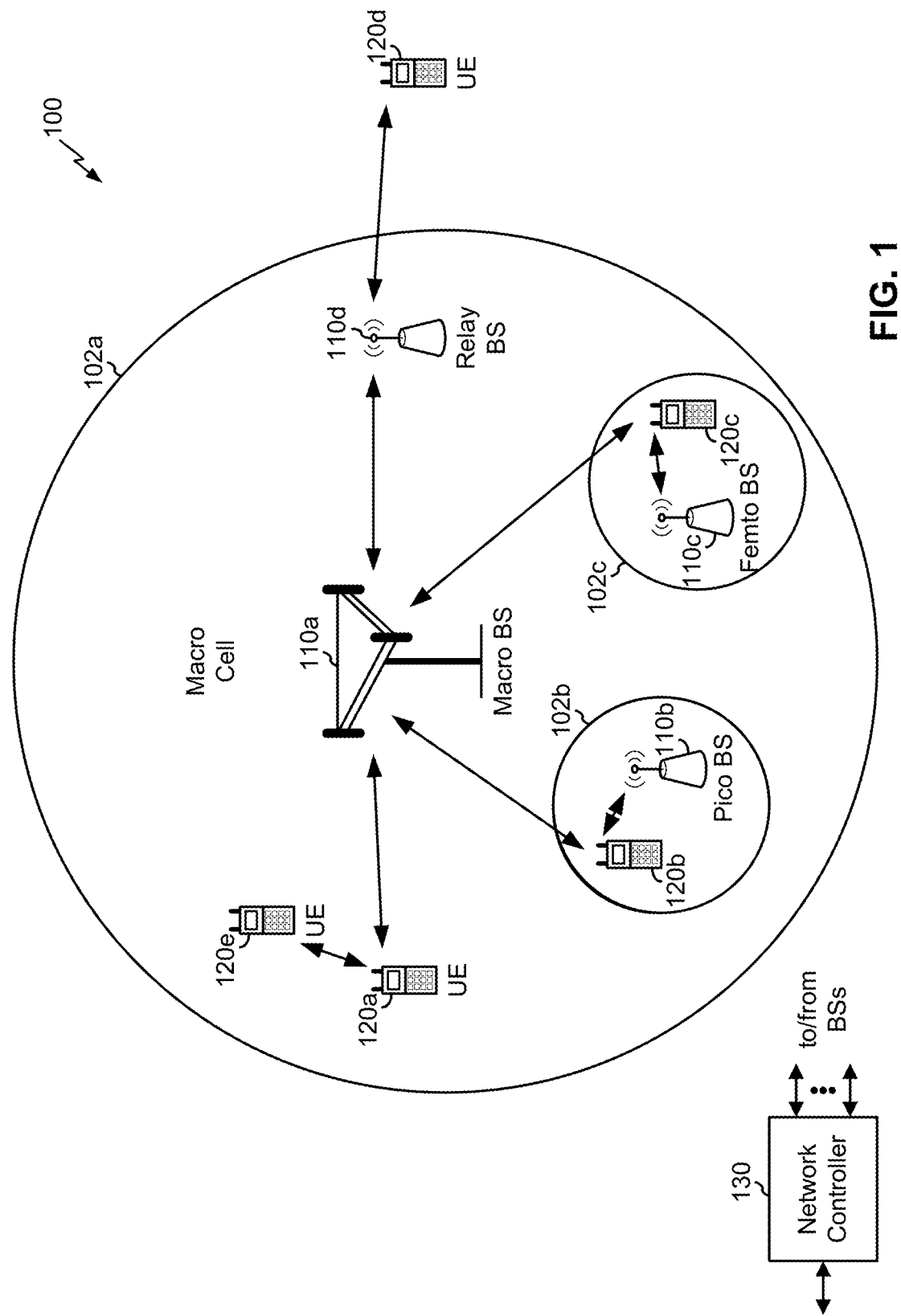
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including one or more antennas, RF-chains, power amplifiers, modulators, buffers, processors, interleavers, adders/summers, and/or the like). It is intended that innovations described herein may be practiced in a wide variety of devices, chip-level components, systems, distributed arrangements, end-user devices, etc. of varying sizes, shapes, and constitution.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipments (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c, 120d, 120e) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
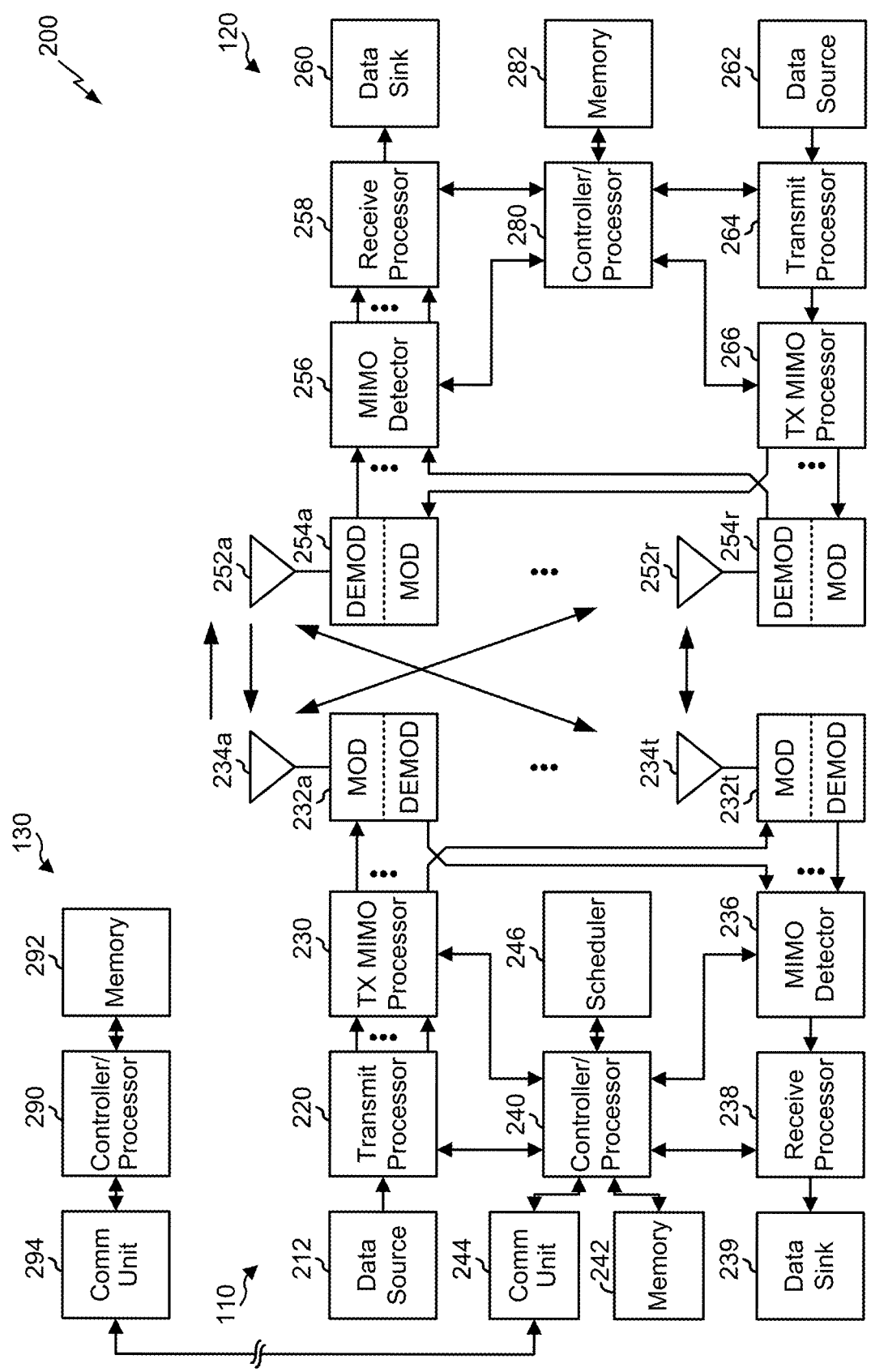
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with utilization of a control region for downlink transmission, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. A scheduler 246 may schedule UEs for data transmission on the downlink and/or uplink.

In some aspects, UE 120 (e.g., an enhanced machine-type communications UE (eMTC UE)) may include means for receiving an indicator (e.g., a control region indicator) indicating use of a control region of a carrier for a downlink transmission; means for determining a backward compatible resource element mapping for the downlink transmission based at least in part on receiving the indicator; and means for receiving, based at least in part on the backward compatible resource element mapping, the downlink transmission during the control region of the carrier; and/or the like. In some aspects, such means may include one or more components of UE 120 described in connection with FIG. 2.

In some aspects, base station 110 may include means for transmitting, to an eMTC UE, an indicator (e.g., a control region indicator) indicating use of a control region of a carrier for a downlink transmission, where the indicator is associated with identifying a backward compatible resource element mapping for the downlink transmission; and means for transmitting, based at least in part on transmitting the indicator and in accordance with the backward compatible resource element mapping, the downlink transmission during the control region of the carrier; and/or the like. In some aspects, such means may include one or more components of base station 110 described in connection with FIG. 2.

As indicated above, FIG. 2 is provided merely as an example. Other examples may differ from what is described with regard to FIG. 2.

Figure 3A:
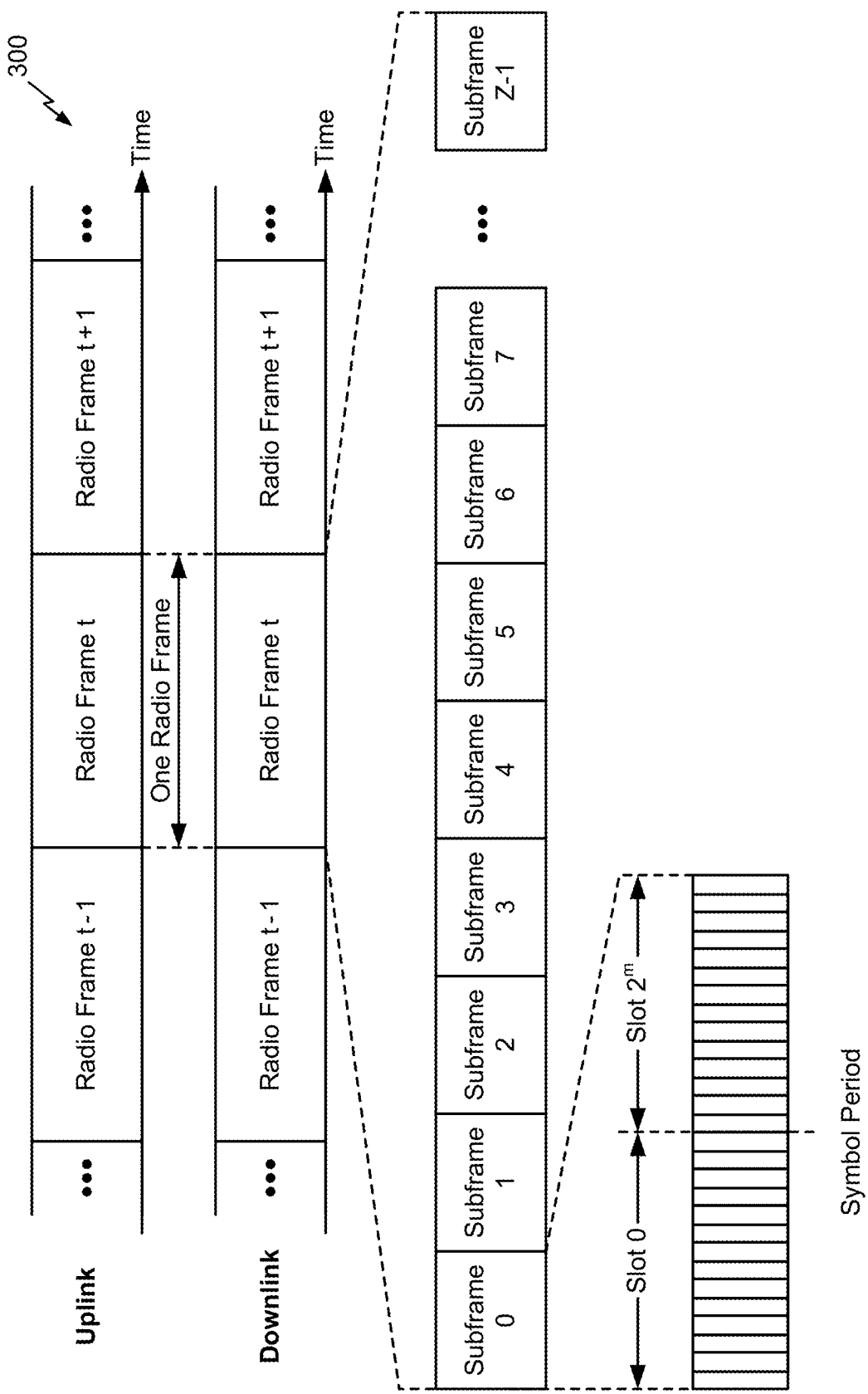
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., 2' slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
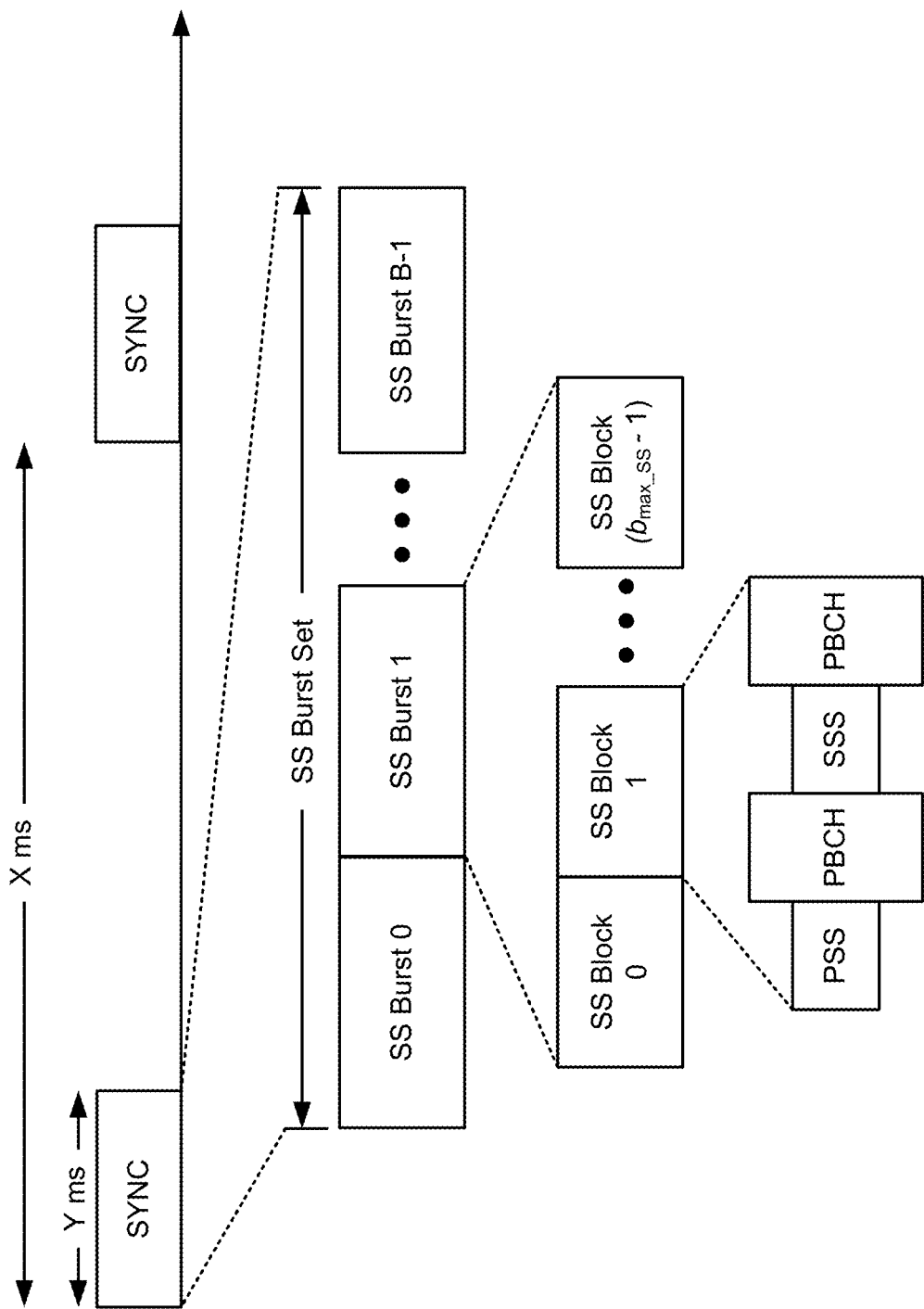
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
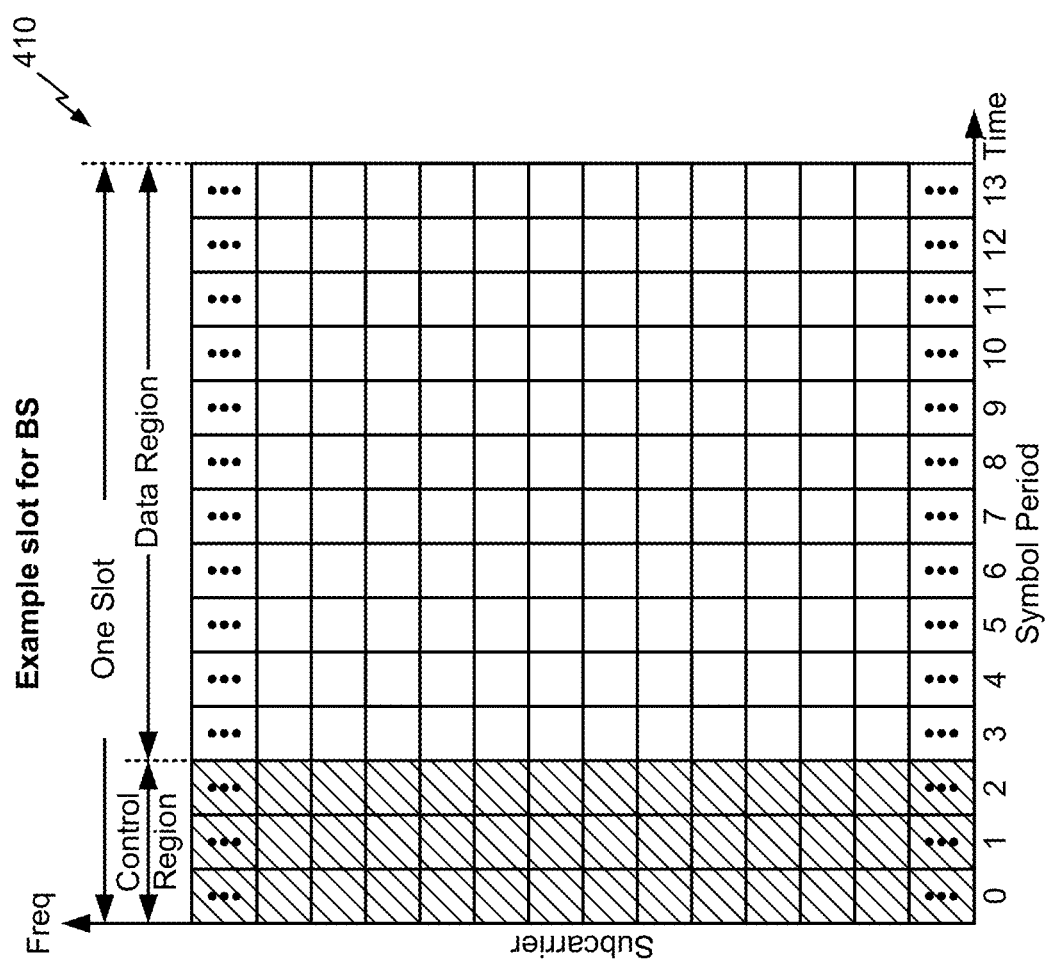
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q E {0, Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra-reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 ms duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

Figure 5:
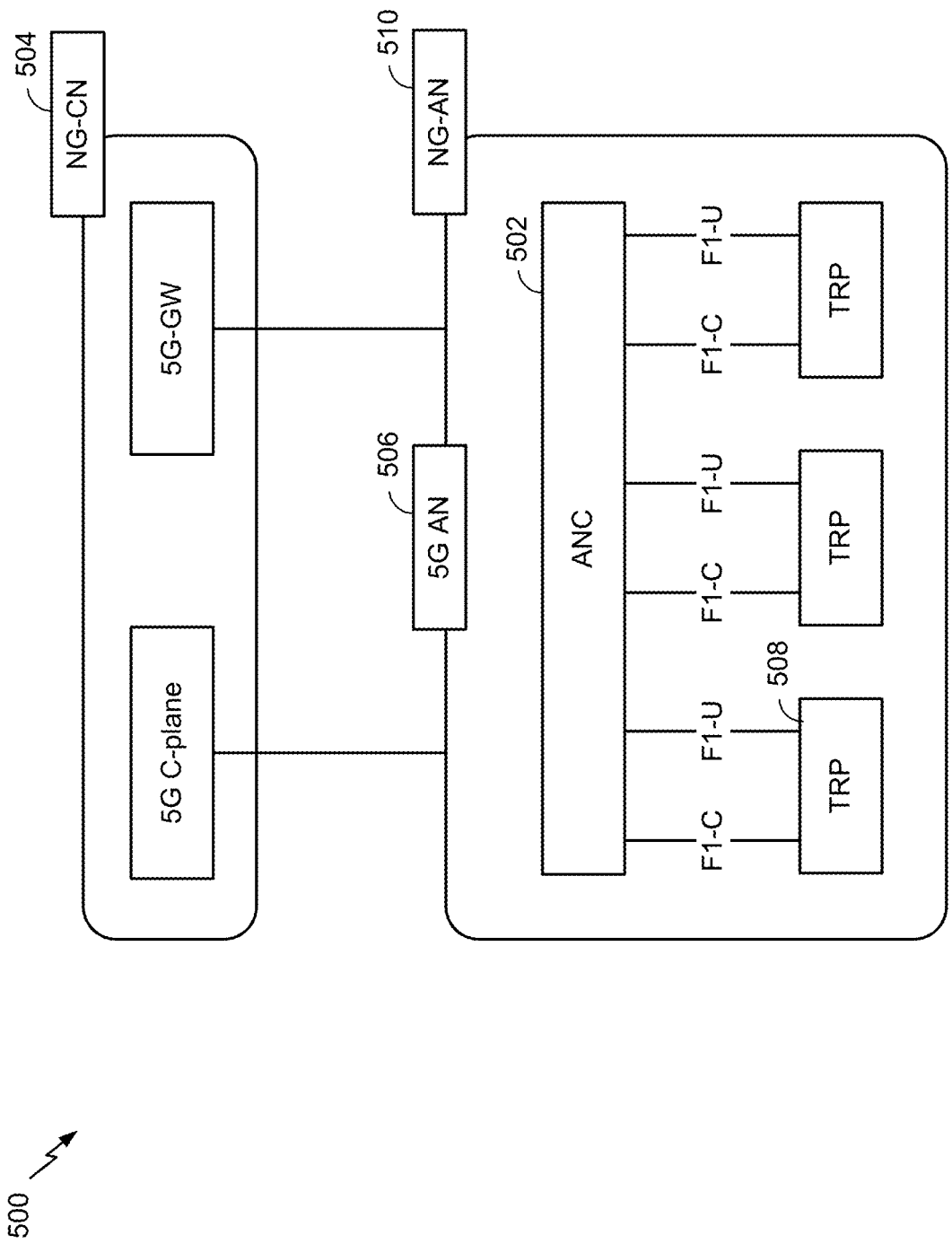
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), medium access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
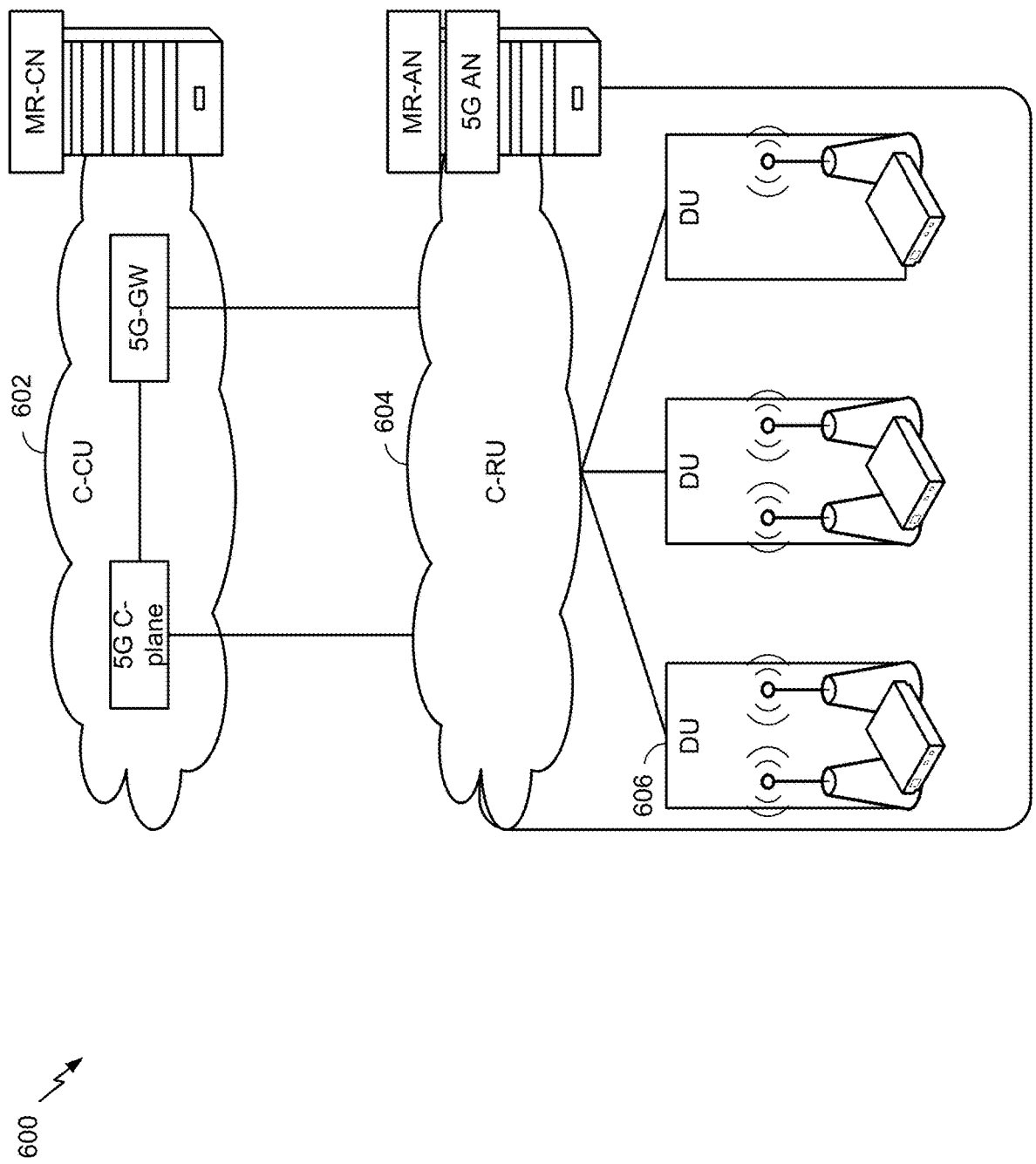
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what is described with regard to FIG. 6.

Figure 7:
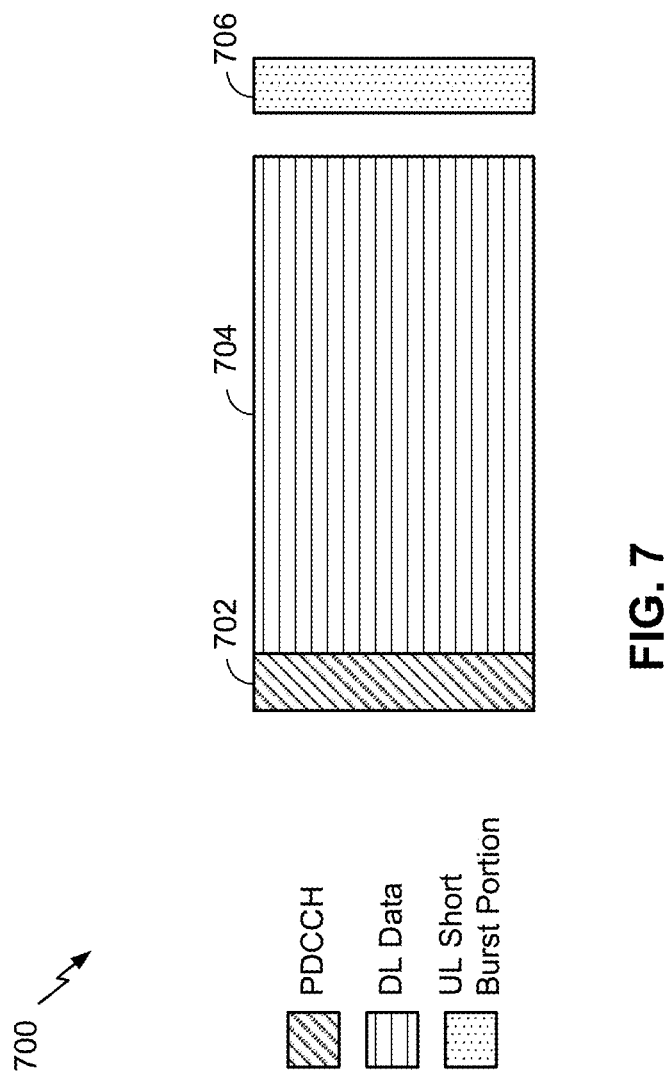
FIG. 7 is a diagram illustrating an example of a downlink (DL)-centric slot, in accordance with various aspects of the present disclosure.

FIG. 7 is a diagram 700 showing an example of a DL-centric slot or wireless communication structure. The DL-centric slot may include a control portion 702, which may be termed a control region. The control portion 702 may exist in the initial or beginning portion of the DL-centric slot. The control portion 702 may include various scheduling information and/or control information corresponding to various portions of the DL-centric slot. In some configurations, the control portion 702 may be a physical DL control channel (PDCCH), as indicated in FIG. 7. In some aspects, the control portion 702 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like. In some aspects, control portion 702 may be used to convey a downlink transmission associated with a machine-type communications physical downlink control channel (MPDCCH), a physical downlink shared channel (PDSCH), and/or the like.

The DL-centric slot may also include a DL data portion 704, which may be termed a data region. The DL data portion 704 may sometimes be referred to as the payload of the DL-centric slot. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric slot may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric slot. For example, the UL short burst portion 706 may include feedback information corresponding to the control portion 702 and/or the data portion 704. Non-limiting examples of information that may be included in the UL short burst portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples may differ from what is described with regard to FIG. 7.

Figure 8:
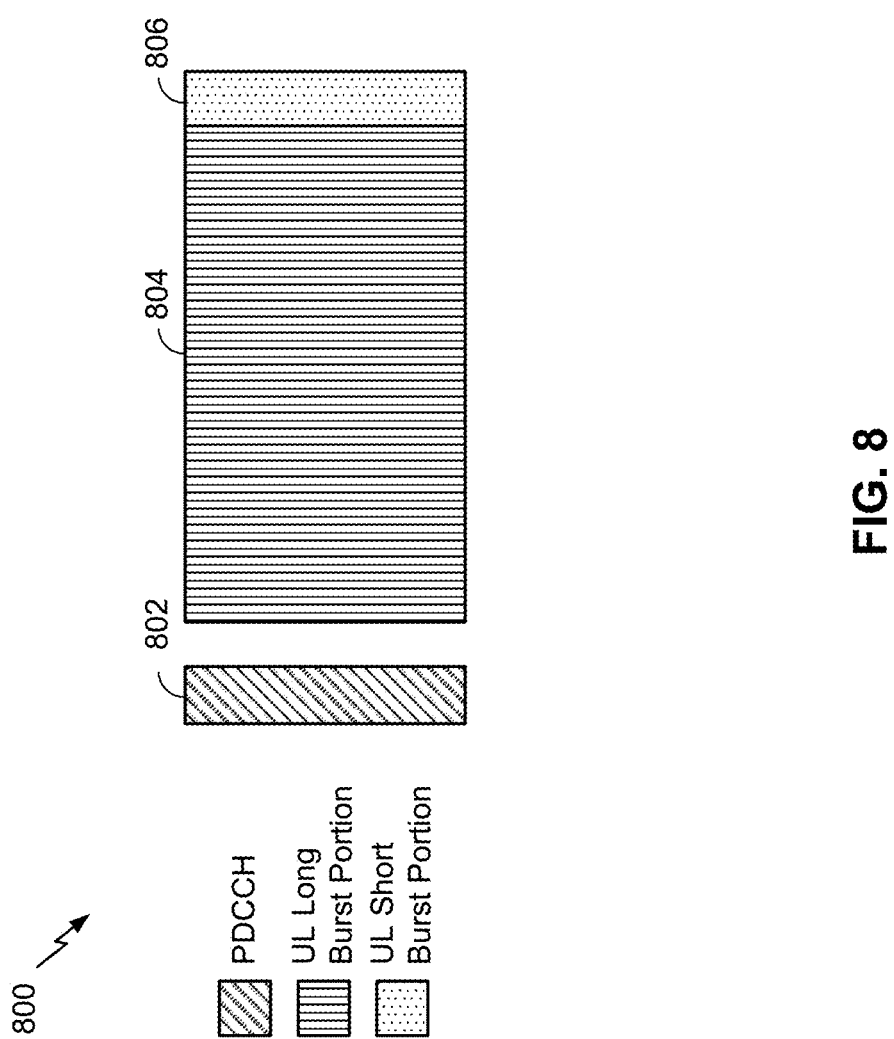
FIG. 8 is a diagram illustrating an example of an uplink (UL)-centric slot, in accordance with various aspects of the present disclosure.

FIG. 8 is a diagram 800 showing an example of an UL-centric slot or wireless communication structure. The UL-centric slot may include a control portion 802. The control portion 802 may exist in the initial or beginning portion of the UL-centric slot. The control portion 802 in FIG. 8 may be similar to the control portion 702 described above with reference to FIG. 7. The UL-centric slot may also include an UL long burst portion 804. The UL long burst portion 804 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the subordinate entity) to UL communication (e.g., transmission by the subordinate entity).

The UL-centric slot may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 8 is provided merely as an example. Other examples may differ from what is described with regard to FIG. 8.

In some communications systems, a plurality of types of user equipment (UEs) may be deployed for use in a common bandwidth. For example, an enhanced machine-type communications (eMTC) type of UE may be deployed for use in a network concurrently with one or more other types of UEs. The eMTC type of UE may be configured to use a narrowband portion of a bandwidth for transmission and reception. As a result, portions of a wideband channel, such as a physical downlink control channel (PDCCH) in an LTE communications system, may not be used when the eMTC type of UE is operating in the network. For example, a control region of each subframe reserved for the PDCCH may not be used for reception by the eMTC type of UE. In a deployment when the eMTC type of UE is using an NR communications system carrier, LTE types of UEs may not be configured, and the control region of the PDCCH is not utilized by any UE.

Some aspects described herein enable utilization of a control region of a carrier for downlink transmission. For example, a UE (e.g., an eMTC UE) may receive an indicator (e.g., a control region indicator) from a BS indicating that the BS is to transmit to the UE using the control region of the carrier, and the UE may receive a downlink transmission in the control region of the carrier based at least in part on receiving the indicator. In this way, the UE and the BS may improve performance by ensuring efficient use of network resources.

Figure 9A:
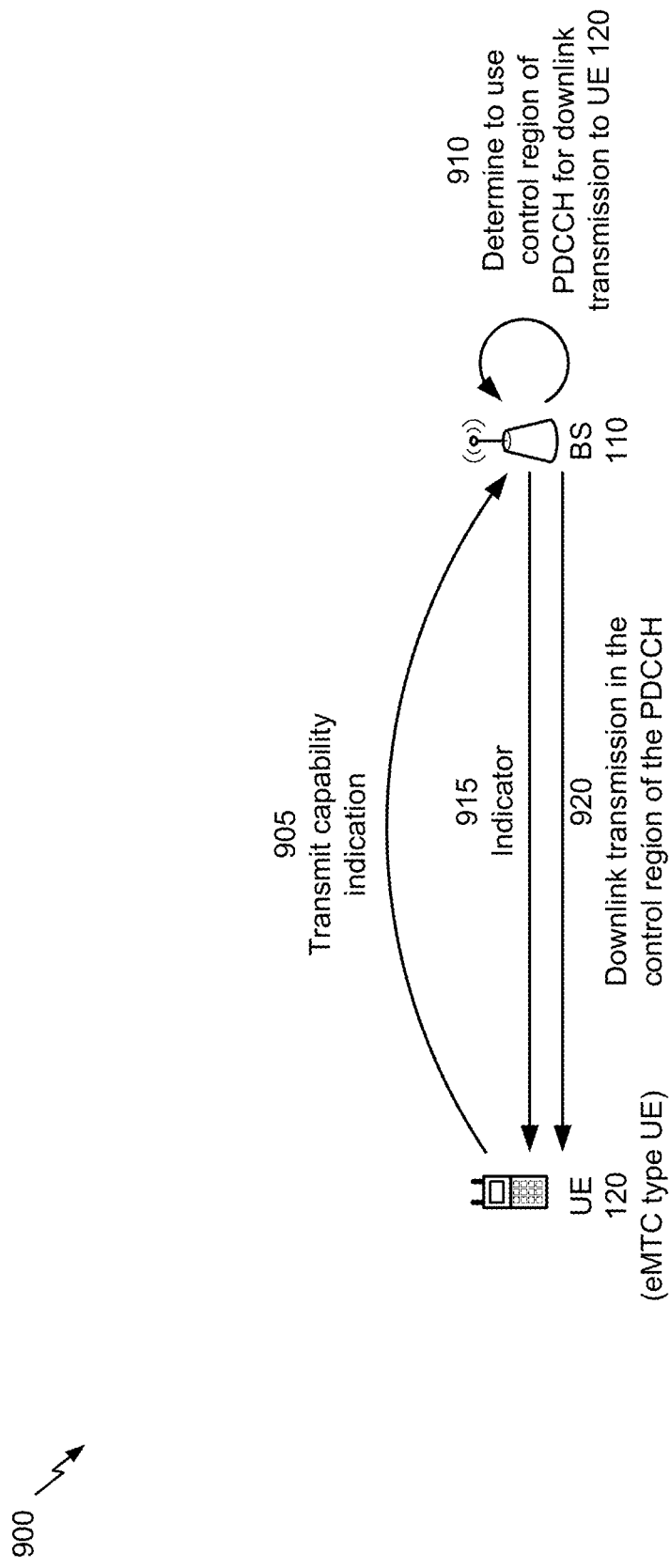

FIGS. 9A-9E are diagrams illustrating an example 900 of utilization of a control region for downlink transmission, in accordance with various aspects of the present disclosure. As shown in FIG. 9A, example 900 includes a BS 110 and a UE 120.

As further shown in FIG. 9A, and by reference number 905, UE 120 (e.g., an eMTC UE) may transmit, and BS 110 may receive, a capability indication. For example, UE 120 may generate and transmit a report of a UE capability to support receiving a downlink transmission in the control region. In this way, UE 120 indicates that the control region may be used for a downlink transmission to enable efficient use of network resources.

As further shown in FIG. 9A, and by reference number 910, BS 110 may determine to use a control region of a carrier for downlink transmission to UE 120. For example, in each subframe, a control region and a data region may be defined for a narrowband, of a set of narrowbands of the carrier, and BS 110 may determine that a downlink transmission is to be provided to UE 120 using at least one control region of a narrowband of at least one subframe of the carrier. In some aspects, the carrier may be an LTE carrier, an NR carrier, and/or the like. In some aspects, BS 110 may determine to use the control region for the downlink transmission based at least in part on receiving the capability indication. In some aspects, BS 110 may perform rate matching. For example, BS 110 may rate match around an LTE control region and may include each resource element in the rate matching except for resource elements reserved for cell-specific reference signals.

As further shown in FIG. 9A, and by reference number 915, BS 110 may transmit, and UE 120 may receive, an indicator (e.g., a control region indicator). For example, BS 110 may generate the indicator to indicate that BS 110 is to provide a downlink transmission in the control region of the carrier. In some aspects, BS 110 may provide the indicator using a particular type of message. For example, BS 110 may provide the indicator using a system information block (SIB) message, a radio resource control (RRC) message, and/or the like. In this case, BS 110 may use a SIB type 1 (SIB-1) message with a 1-bit flag configured to provide information identifying whether use of a control region for downlink transmission is enabled or disabled (e.g., for LTE-machine type communication (LTE-MTC) transmission).

Additionally, or alternatively, separate configuration and/or separate signaling may be used for different search spaces and radio network temporary identifiers (RNTIs). In this case, when the indicator is provided via a SIB message, UE 120 may determine a search space, a broadcast RNTI (e.g., a paging RNTI (P-RNTI) for paging, a system information RNTI (SI-RNTI) for system information, a random access RNTI (RA-RNTI) and temporary RNTI for random access, a group RNTI (G-RNTI) for multi-cast), and/or the like based at least in part on the SIB message, for transmission in the control region. In another example, when the indicator is provided via an RRC message, UE 120 may determine a unicast RNTI (e.g., a cell RNTI (C-RNTI) and semi-persistent scheduling C-RNTI (SPS C-RNTI)) and a UE specific search space for downlink transmission in the control region.

In some aspects, UE 120 may determine one or more parameters associated with receiving the downlink transmission based at least in part on information included in the indicator. For example, UE 120 may determine one or more symbols in the control region for the downlink transmission based at least in part on the indicator. Additionally, or alternatively, UE 120 may, based at least in part on a first bitmap of the indicator identifying a resource block granularity, a narrowband granularity, and/or the like, determine a set of frequency domain resources for receiving the downlink transmission. In this case, usage of the control region is on a narrowband or a resource block (RB) level basis (e.g., usage of the control region is not allowed in narrowbands or RBs overlapping with an NR control resource set (CORE-SET)).

In another example, UE 120 may determine a set of time domain resources for receiving the downlink transmission based at least in part on a second bitmap of the indicator. In this case, the usage of the control region is supported only in a subset of the subframes of the carrier (e.g., the usage of the control region is not allowed in the subframes overlapping with NR control resource set). The set of subframes of the control region may be different from the set of subframes of a data region. For example, a subframe reserved for SIB1 transmission may be configured as invalid for the downlink transmission in the data region but valid for the control region.

In some aspects, UE 120 may determine a narrowband in which to receive the downlink transmission based at least in part on the indicator. For example, UE 120 may determine a particular narrowband, of a set of narrowbands of the carrier, in which to receive the downlink transmission based at least in part on one or more bitmaps of the indicator. Additionally, or alternatively, UE 120 may determine a physical resource block, a subframe, and/or the like for receiving the downlink transmission based at least in part on one or more bitmaps of the indicator.

As further shown in FIG. 9A, and by reference number 920, BS 110 may transmit, and UE 120 may receive, the downlink transmission in the control region of the carrier. For example, BS 110 may provide a machine-type communication (MTC) physical downlink control channel (MPDCCH) downlink transmission, a physical downlink shared channel (PDSCH) downlink transmission, and/or the like. In some aspects, UE 120 may receive at least a portion of the downlink transmission in a data region of a subframe. For example, UE 120 may receive a first portion of the downlink transmission in the control region and a second portion of the downlink transmission in the data region.

Figure 9B:
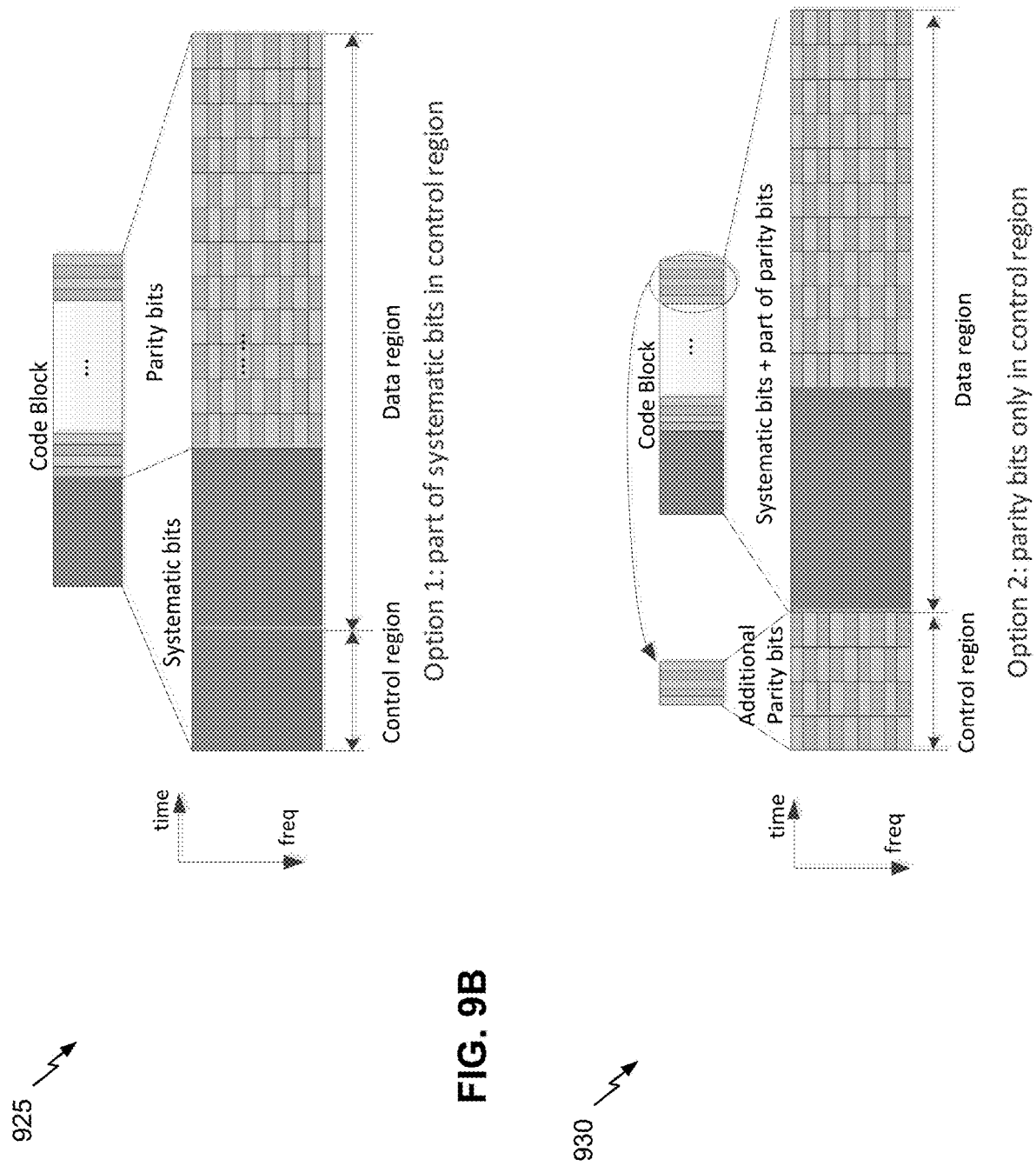

In some aspects, UE 120 and/or BS 110 may perform resource element mapping. For example, as shown in FIG. 9B, and by diagram 925, a first part of a set of systematic bits may be mapped (e.g., by BS 110 in encoding of a transmission and in UE 120 in decoding of a reception) to a control region and a second part of the set of systematic bits may be mapped to a data region. In this case, BS 110 may provide and UE 120 may receive parity bits in the data region, and BS 110 may provide and UE 120 may receive systematic bits in the control region and a portion of the data region. Additionally, or alternatively, as shown in FIG. 9B, and by diagram 930, parity bits may be mapped to the control region and to the data region, and the systematic bits may be mapped to the data region and not the control region.

In some aspects, the resource element mapping may be a backward compatible resource element mapping. For example, UE 120 and/or BS 110 may use a resource element mapping to ensure backward compatibility with LTE-MTC downlink transmission. The backward compatible resource element mapping may enable decoding of downlink transmissions using bits of a data region and not using bits of a control region. In some aspects, the backward compatible resource element mapping may be channel specific. For example, UE 120 and/or BS 110 may use different resource element mappings for MPDCCH transmissions and for PDSCH transmissions.

In some aspects, when the downlink transmission is received in both the control region of a subframe and the data region of the subframe, resource element mapping may be performed frequency first, time second starting with a first symbol in the control symbol and then with symbols in the data region. Additionally, or alternatively, resource element mapping may be performed on a frequency first, time second basis for the data region and then for the control region.

Figure 9C:
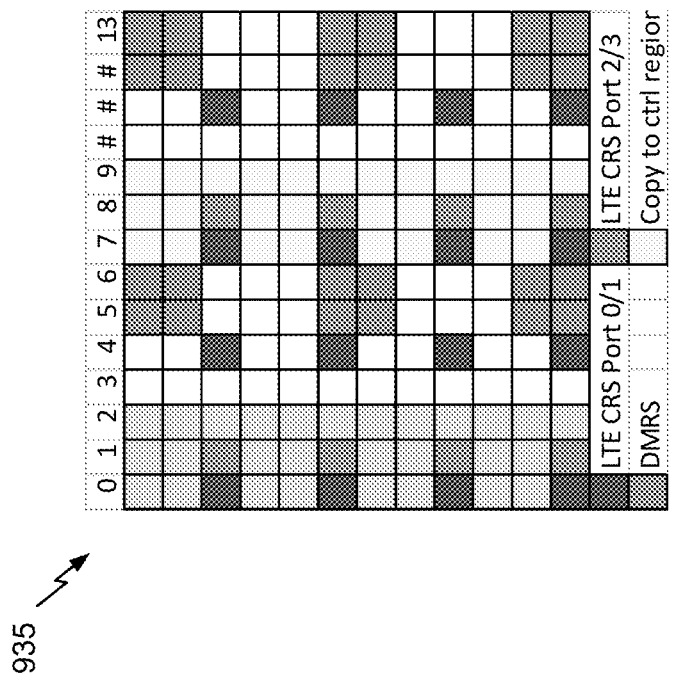
Figure 9D:
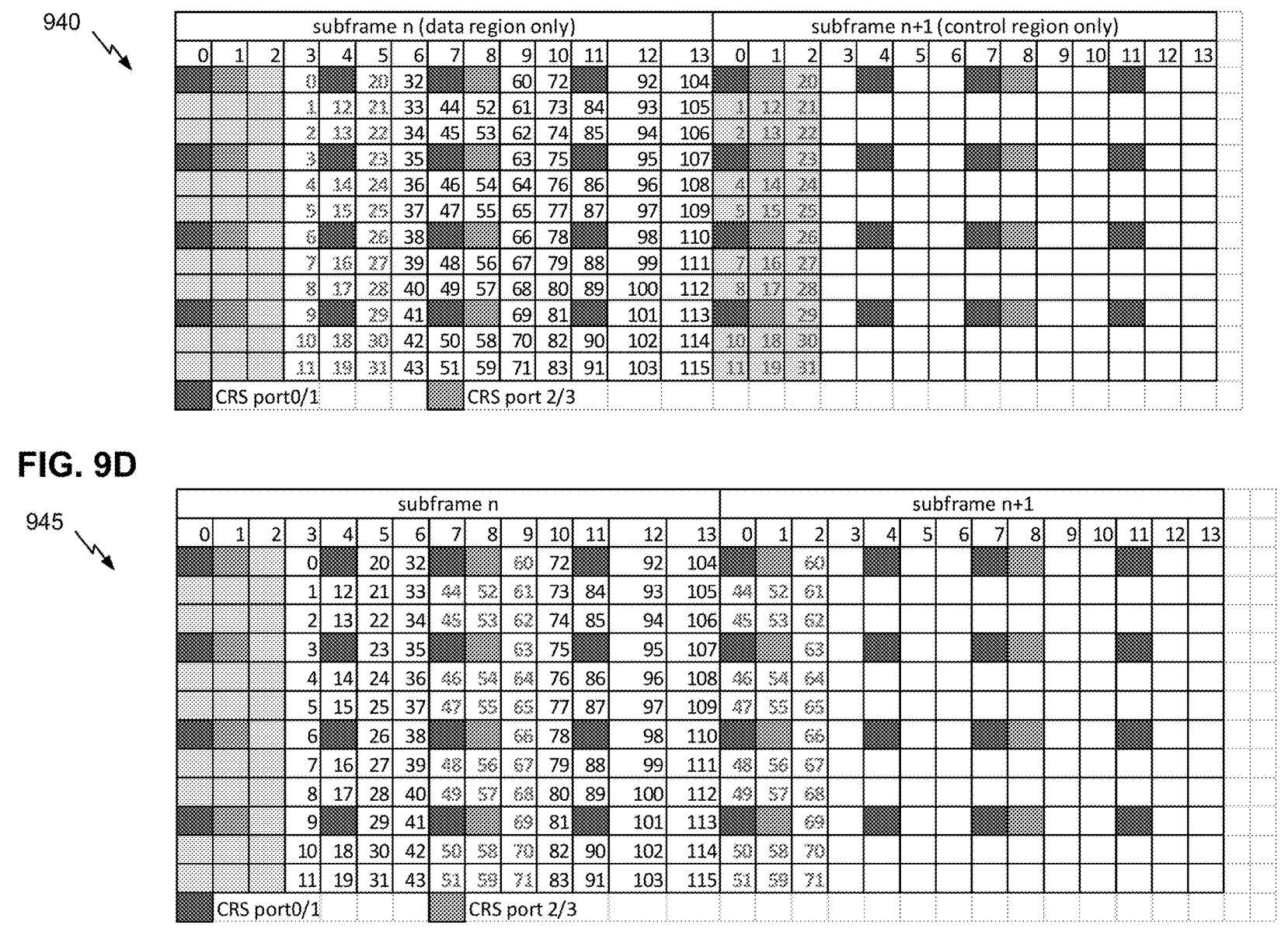

Additionally, or alternatively, resource element mapping may be performed in the data region and then by repeating in-phase and quadrature (IQ) data of a subset of symbols of the data region to the control region. In some aspects, the subset of symbols may be initial symbols of a second slot of the data region. For example, as shown in FIG. 9C, and by diagram 935, the IQ data may relate to symbols 7, 8, and 9, thereby enabling intra-subframe symbol level combining. In this case, a fixed time-domain mapping may be used, and resource elements used for MPDCCH in a first set of symbols in a second slot may be copied to a corresponding first set of symbols in a first slot. In some aspects, the first set of symbols may be a particular quantity of symbols, $I_{MPDCCH}$, that may be selected as sequentially first symbols in, for example, the second slot, In some aspects, when the downlink transmission is received in the control region and not the data region, the resource element mapping may be performed for a control channel or a shared channel in the control region on a frequency first, time second basis and based at least in part on a set of available resource elements of the control region. Additionally, or alternatively, resource element mapping may be performed by repeating in-phase and quadrature (IQ) data of a subset of symbols of a data region to the control region, thereby enabling inter-subframe symbol level combining of a control region of one subframe with a data region of another subframe. For example, as shown in FIG. 9D, and by diagram 940, BS 110 may copy a first quantity of symbols (e.g., a size of the control region) of a data region by puncturing resource elements reserved for a reference signal in the control region. In this case, BS 110 repeats IQ data on symbols 3, 4, and 5 to the control region. Additionally, or alternatively, as shown in FIG. 9D, and by diagram 945, BS 110 may repeat a first quantity of symbols of a second slot (e.g., symbols 7, 8, and 9) to the control region with a common symbol to resource element mapping as with the data region.

In some aspects, the resource element mapping may be performed on a per RNTI basis, a per search space basis, a per channel type basis, and/or the like. For example, for broadcast information (e.g., P-RNTI, SI-RNTI, RA-RNTI, G-RNTI or MPDCCH on a common search space), resource element mapping may be performed by enabling UE 120, which may not be aware of the control region, to still be able to decode the broadcast information. For unicast information (e.g., using a UE specific search), the resource element mapping may be performed frequency first, time second starting with a first symbol in the control region and then with symbols in the data region. In some aspects, by using backward compatible resource element mapping, BS 110 may enable different types of UEs 120 (e.g., legacy UEs 120 and non-legacy UEs 120) to decode a downlink transmission. For example, a legacy UE 120 may decode the downlink transmission using only bits of a data region. In contrast, a non-legacy UE 120, that can receive from the control region, may use bits of the data region and bits of the control region to decode the downlink transmission, thereby enabling improved decoding performance, lower coding rates (e.g., for PDSCH transmission), symbol repetition gain (e.g., for MPDCCH transmission), and/or the like.

In some aspects, such as for a subframe with a control region for MPDCCH or PDSCH transmission, BS 110 may not count one or more subframes for the downlink transmission when performing resource mapping. In this case, if a downlink transmission is configured with a particular quantity of repetitions, the actual quantity of transmission subframes may be larger than the configured quantity of repetitions since one or more subframes associated with the control region may be omitted from a determination relating to the downlink transmission. Additionally, or alternatively, the determination relating to the downlink transmission may be performed on a per channel type basis and may be different for an MPDCCH and a PDSCH.

Figure 9E:
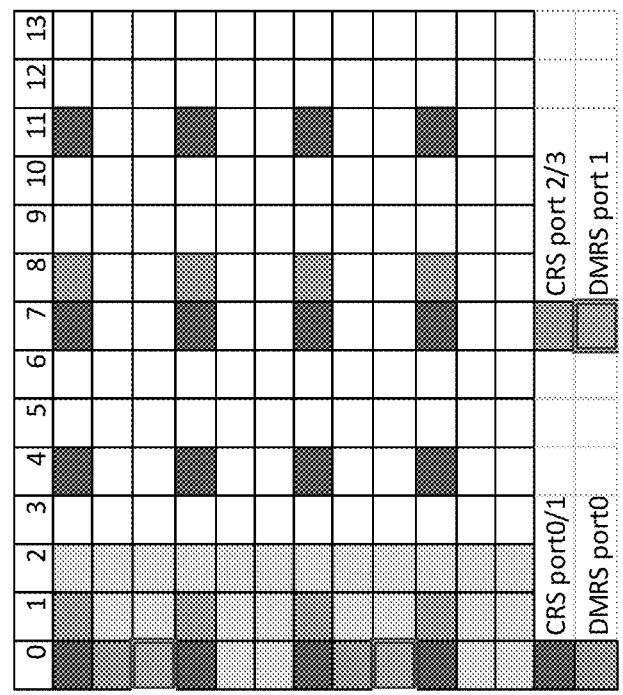

In some aspects, when the downlink transmission is received in the control region and not the data region, UE 120 may receive a demodulation reference signal (DMRS) in the control region. For example, two DMRS ports may be located in a first symbol spanning a set of consecutive resource elements, and UE 120 may receive the DMRS, which may enable improved channel estimation performance (e.g., for a DMRS based transmission scheme for a MPDCCH or a PDSCH). For example, as shown in FIG. 9E, and by diagram 950, BS 110 may provide, and UE 120 may receive, a particular DMRS pattern in the control region. In some aspects, frequency-domain orthogonal cover code (OCC) with length-2 may also be used for the two DMRS ports on the first symbols.

In some aspects, BS 110 may provide, and UE 120 may receive, a particular set of MPDCCH candidates configured for the control region. For example, BS 110 may use a particular set of time domain resources, frequency domain resources, and/or the like to transmit the MPDCCH candidates. In this case, the MPDCCH candidates may span 2 physical resource blocks (PRBs), 4 PRBs, and/or the like, and aggregation level 2 or aggregation level 4 may be used. In some aspects, UE 120 may receive the MPDCCH candidates, which may be scrambled using a group RNTI for UE 120 and/or one or more other UEs, and UE 120 may receive the MPDCCH candidates in a common search space, a UE-specific search space, and/or the like. In this case, based at least in part on UE 120 being configured for aggregation level 2 or aggregation level 4, UE 120 may be configured to receive the MPDCCH candidates using at least one of the control region of a subframe or a data region of the subframe to avoid excessive blind decoding.

In some aspects, UE 120 may receive a particular type of PDSCH transmission in the control region. For example, UE 120 may receive a short PDSCH with a reduced information content relative to other PDSCH transmissions, which may enable receipt by UE 120 (e.g., an eMTC UE).

As indicated above, FIGS. 9A-9E are provided as an example. Other examples may differ from what is described with respect to FIGS. 9A-9E.

Figure 10:
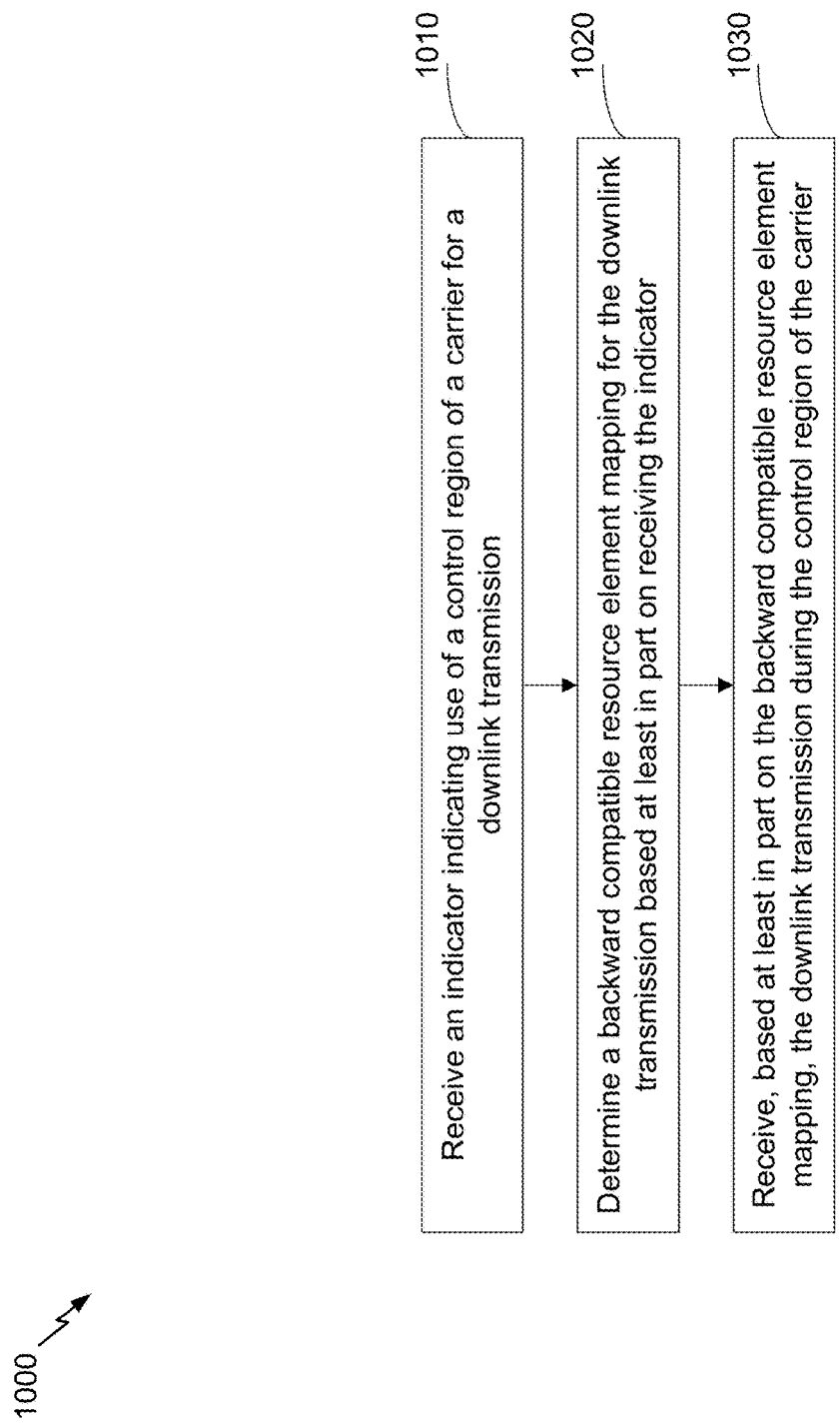
FIG. 10 is a diagram illustrating an example process performed, for example, by an enhanced machine-type communications user equipment, in accordance with various aspects of the present disclosure.

FIG. 10 is a diagram illustrating an example process 1000 performed, for example, by an eMTC UE, in accordance with various aspects of the present disclosure. Example process 1000 is an example where an eMTC UE (e.g., UE 120 and/or the like) performs operations associated with utilization of a control region for a downlink transmission.

As shown in FIG. 10, in some aspects, process 1000 may include receiving an indicator indicating use of a control region of a carrier for a downlink transmission (block 1010). For example, the eMTC UE (e.g., using receive processor 258, transmit processor 264, controller/processor 280, memory 282, and/or the like) may receive an indicator (e.g., a control region indicator) indicating use of a control region of a carrier for a downlink transmission, as described above.

As further shown in FIG. 10, in some aspects, process 1000 may include determining a backward compatible resource element mapping for the downlink transmission based at least in part on receiving the indicator (block 1020). For example, the eMTC UE (e.g., using receive processor 258, transmit processor 264, controller/processor 280, memory 282, and/or the like) may determine a backward compatible resource element mapping for the downlink transmission based at least in part on receiving the indicator, as described above.

As further shown in FIG. 10, in some aspects, process 1000 may include receiving, based at least in part on the backward compatible resource element mapping, the downlink transmission during the control region of the carrier (block 1030). For example, the eMTC UE (e.g., using receive processor 258, transmit processor 264, controller/processor 280, memory 282, and/or the like) may receive, based at least in part on the backward compatible resource element mapping, the downlink transmission during the control region of the carrier, as described above.

Process 1000 may include additional aspects, such as any single aspect or any combination of aspects described below and/or in connection with one or more other processes described elsewhere herein.

In a first aspect, the indicator is included in a system information block message or a radio resource control message.

In a second aspect, alone or in combination with the first aspect, the downlink transmission is associated with a machine-type communications physical downlink control channel or a physical downlink shared channel.

In a third aspect, alone or in combination with one or more of the first and second aspects, the indicator identifies one or more symbols in the control region for the downlink transmission.

In a fourth aspect, alone or in combination with one or more of the first through third aspects, the indicator includes two or more bitmaps, a first bitmap, of the two or more bitmaps, identifies a set of frequency domain resources using at least one of a resource block granularity, a narrowband granularity, and a second bitmap, of the two or more bitmaps, identifies a set of time domain resources of subframes associated with the control region.

In a fifth aspect, alone or in combination with one or more of the first through fourth aspects, the downlink transmission is received using at least one of: a narrowband, of a set of narrowbands of the control region, configured by a bitmap, a physical resource block, of a set of physical resource blocks of the control region, configured by the bitmap, or a subframe, of a set of subframes associated with the control region, configured by the bitmap.

In a sixth aspect, alone or in combination with one or more of the first through fifth aspects, the downlink transmission is received using at least one of the control region of a subframe or a data region of the subframe.

In a seventh aspect, alone or in combination with one or more of the first through sixth aspects, the downlink transmission is received using the control region of a subframe and a data region of the subframe, and resource element mapping is performed on a frequency first, time second basis for the data region and then to the control region.

In an eighth aspect, alone or in combination with one or more of the first through seventh aspects, the downlink transmission is received using the control region of a subframe and a data region of the subframe, and resource element mapping is performed using the data region and then repeating in-phase and quadrature (IQ) data of a subset of symbols of the data region to the control region.

In a ninth aspect, alone or in combination with one or more of the first through eighth aspects, the subset of symbols is an initial subset of symbols of a data region, and the backward compatible resource element mapping includes puncturing one or more resource elements reserved for cell specific reference signals in the control region.

In a tenth aspect, alone or in combination with one or more of the first through ninth aspects, resource element mapping is performed on at least one of a per radio network temporary identifier basis, a per search space basis, or a per channel type basis.

In an eleventh aspect, alone or in combination with one or more of the first through tenth aspects, the eMTC UE is configured to provide a capability indication identifying a capability of receiving the downlink transmission in the control region, and the downlink transmission in the control region is received based at least in part on providing the capability indication.

In a twelfth aspect, alone or in combination with one or more of the first through eleventh aspects, the backward compatible resource element mapping is a channel-specific resource element mapping.

In a thirteenth aspect, alone or in combination with one or more of the first through twelfth aspects, the eMTC UE is configured to decode the downlink transmission using bits of a data region and without decoding bits of a control region.

In a fourteenth aspect, alone or in combination with one or more of the first through thirteenth aspects, the eMTC UE is configured to decode the downlink transmission using bits of a data region and bits of a control region.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
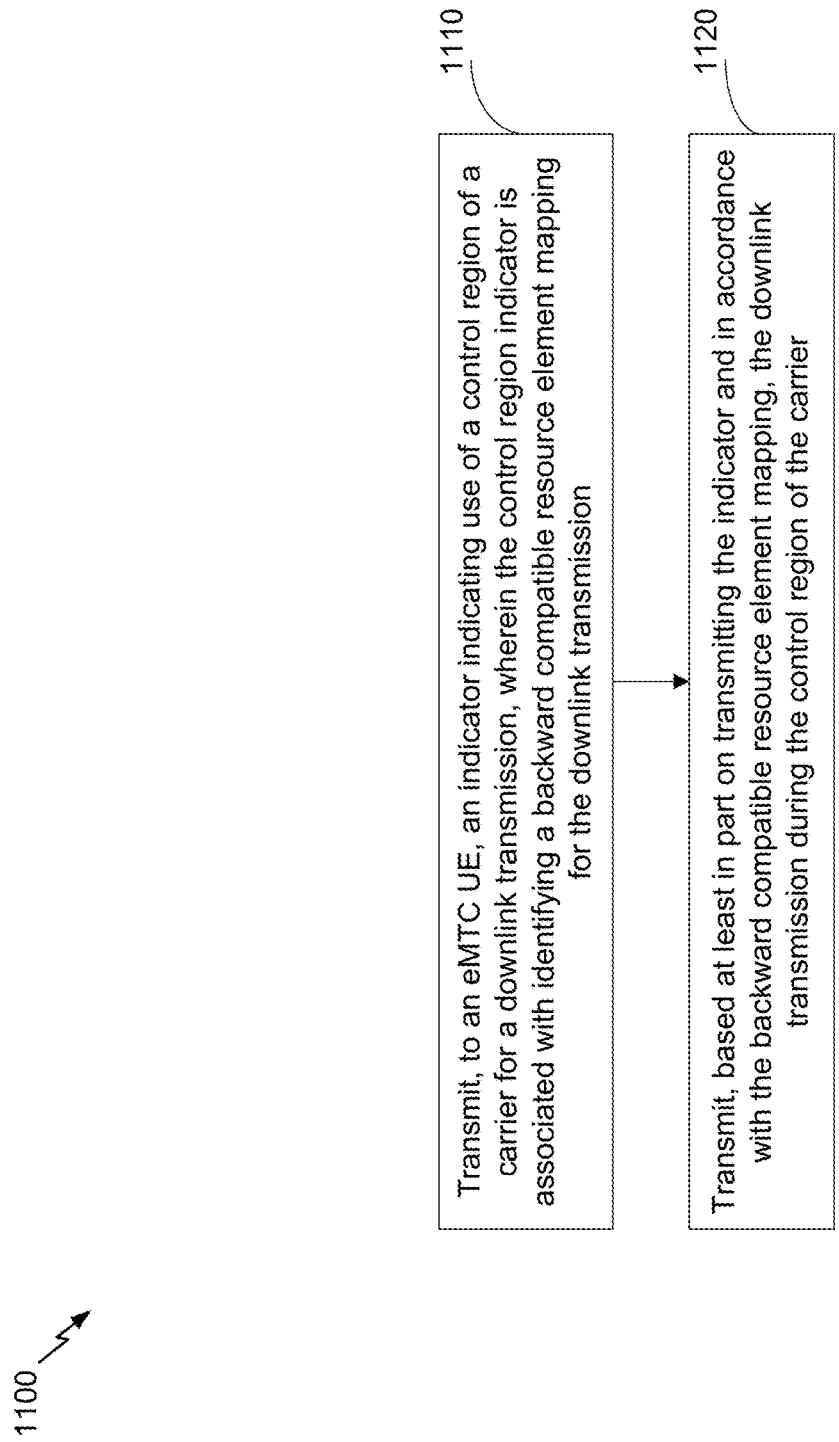
FIG. 11 is a diagram illustrating an example process performed, for example, by a base station, in accordance with various aspects of the present disclosure.

FIG. 11 is a diagram illustrating an example process 1100 performed, for example, by a BS, in accordance with various aspects of the present disclosure. Example process 1100 is an example where a BS (e.g., BS 110 and/or the like) performs operations associated with utilization of a control region for a downlink transmission.

As shown in FIG. 11, in some aspects, process 1100 may include transmitting, to an eMTC UE, an indicator indicating use of a control region of a carrier for a downlink transmission wherein the indicator is associated with identifying a backward compatible resource element mapping for the downlink transmission (block 1110). For example, the BS (e.g., using transmit processor 220, receive processor 238, controller/processor 240, memory 242, and/or the like) may transmit, to an eMTC UE, an indicator indicating use of a control region of a carrier for a downlink transmission and wherein the indicator is associated with identifying a backward compatible resource element mapping for the downlink transmission, as described above. In some aspects, the indicator is associated with identifying a backward compatible resource element mapping for the downlink transmission.

As further shown in FIG. 11, in some aspects, process 1100 may include transmitting, based at least in part on transmitting the indicator and in accordance with the backward compatible resource element mapping, the downlink transmission during the control region of the carrier (block 1120). For example, the BS (e.g., using transmit processor 220, receive processor 238, controller/processor 240, memory 242, and/or the like) may transmit, based at least in part on transmitting the indicator and in accordance with the backward compatible resource element mapping, the downlink transmission during the control region of the carrier, as described above.

Process 1100 may include additional aspects, such as any single aspect or any combination of aspects described below and/or in connection with one or more other processes described elsewhere herein.

In a first aspect, the indicator is included in a system information block message or a radio resource control message.

In a second aspect, alone or in combination with the first aspect, the downlink transmission is associated with a machine-type communications physical downlink control channel or a physical downlink shared channel.

In a third aspect, alone or in combination with one or more of the first and second aspects, the indicator identifies one or more symbols in the control region for the downlink transmission.

In a fourth aspect, alone or in combination with one or more of the first through third aspects, the indicator includes two or more bitmaps, a first bitmap, of the two or more bitmaps, identifies a set of frequency domain resources using at least one of: a resource block granularity, a narrowband granularity, and a second bitmap, of the two or more bitmaps, identifies a set of time domain resources of subframes associated with the control region.

In a fifth aspect, alone or in combination with one or more of the first through fourth aspects, the downlink transmission is transmitted using at least one of: a narrowband, of a set of narrowbands of the control region, configured by a bitmap; a physical resource block, of a set of physical resource blocks of the control region, configured by the bitmap; or a subframe, of a set of subframes associated with the control region, configured by the bitmap.

In a sixth aspect, alone or in combination with one or more of the first through fifth aspects, the downlink transmission is transmitted using at least one of the control region of a subframe or a data region of the subframe.

In a seventh aspect, alone or in combination with one or more of the first through sixth aspects, the downlink transmission is transmitted using the control region of a subframe and a data region of the subframe, and resource element mapping is performed on a frequency first, time second basis for the data region and then to the control region.

In an eighth aspect, alone or in combination with one or more of the first through seventh aspects, the downlink transmission is transmitted using the control region of a subframe and a data region of the subframe, and resource element mapping is performed using the data region and then repeating in-phase and quadrature (IQ) data of a subset of symbols of the data region to the control region.

In a ninth aspect, alone or in combination with one or more of the first through eighth aspects, the subset of symbols is an initial subset of symbols of a data region, and the backward compatible resource element mapping includes puncturing one or more resource elements reserved for cell specific reference signals in the control region.

In a tenth aspect, alone or in combination with one or more of the first through ninth aspects, resource element mapping is performed on at least one of a per radio network temporary identifier basis, a per search space basis, or a per channel type basis.

In an eleventh aspect, alone or in combination with one or more of the first through tenth aspects, the BS is configured to receive a capability indication identifying a capability of the eMTC UE of receiving the downlink transmission in the control region, and the downlink transmission is transmitted based at least in part on receiving the capability indication.

In a twelfth aspect, alone or in combination with one or more of the first through eleventh aspects, the backward compatible resource element mapping is a channel-specific resource element mapping.

In a thirteenth aspect, alone or in combination with one or more of the first through twelfth aspects, the backwards compatible resource element mapping is configured such that the downlink transmission is decodable using bits of a data region and without decoding bits of a control region.

In a fourteenth aspect, alone or in combination with one or more of the first through thirteenth aspects, the backwards compatible resource element mapping is configured such that the downlink transmission is decodable using bits of a data region and bits of a control region.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by an enhanced machine-type communications (eMTC) user equipment (UE), comprising:
   receiving, via a system information block (SIB) type 1 (SIB-1), an indicator comprising a one-bit flag configured to indicate whether use of a control region of a Long Term Evolution (LTE) physical downlink control channel (PDCCH) for a downlink transmission is enabled or disabled; and
   receiving, based at least in part on a backward compatible resource element mapping that is determined based at least in part on receiving the indicator, the downlink transmission during the control region.

2. The method of claim 1, wherein the indicator is included in a system information block message or a radio resource control message.

3. The method of claim 1, wherein the downlink transmission is associated with a machine-type communications physical downlink control channel or a physical downlink shared channel.

4. The method of claim 1, wherein the indicator identifies one or more symbols in the control region for the downlink transmission.

5. The method of claim 1, wherein the indicator includes two or more bitmaps,
   wherein a first bitmap, of the two or more bitmaps, identifies a set of frequency domain resources using at least one of: a resource block granularity, a narrowband granularity, and
   wherein a second bitmap, of the two or more bitmaps, identifies a set of time domain resources of subframes associated with the control region.

6. The method of claim 1, wherein the downlink transmission is received using at least one of:
   a narrowband, of a set of narrowbands of the control region, configured by a bitmap,
   a physical resource block, of a set of physical resource blocks of the control region, configured by the bitmap, or
   a subframe, of a set of subframes associated with the control region, configured by the bitmap.

7. The method of claim 1, wherein the downlink transmission is received using the control region of a subframe and a data region of the subframe and the backward compatible resource element mapping is performed on a frequency first, time second basis for the data region and then to the control region.

8. The method of claim 1, wherein the downlink transmission is received using the control region of a subframe and a data region of the subframe and the backward compatible resource element mapping is performed using the data region and then repeating in-phase and quadrature (IQ) data of a subset of symbols of the data region to the control region.

9. The method of claim 8, wherein the subset of symbols is an initial subset of symbols of a second slot of the data region.

10. The method of claim 8, wherein the subset of symbols is another subset of symbols of the data region and the backward compatible resource element mapping includes puncturing one or more resource elements reserved for cell specific reference signals in the control region.

11. The method of claim 1, wherein resource element mapping is performed on at least one of a per radio network temporary identifier basis, a per search space basis, or a per channel type basis.

12. The method of claim 1, wherein the eMTC UE is configured to provide a capability indication identifying a capability of receiving the downlink transmission in the control region, and
wherein the downlink transmission in the control region is received based at least in part on providing the capability indication.

13. The method of claim 1, wherein the backward compatible resource element mapping is a channel-specific resource element mapping.

14. The method of claim 1, wherein the eMTC UE is configured to decode the downlink transmission, based at least in part on the backward compatible resource element mapping, using bits of a data region and without decoding bits of a control region.

15. The method of claim 1, wherein the eMTC UE is configured to decode the downlink transmission using bits of a data region and bits of a control region.

16. A method of wireless communication performed by a network entity, comprising:
transmitting, via a system information block (SIB) type 1 (SIB-1) and for an enhanced machine-type communications (eMTC) user equipment (UE), an indicator comprising a one-bit flag configured to indicate whether use of a control region of a Long Term Evolution (LTE) physical downlink control channel (PDCCH) for a downlink transmission is enabled or disabled,
wherein the indicator is associated with identifying a backward compatible resource element mapping for the downlink transmission; and
transmitting, based at least in part on transmitting the indicator and in accordance with the backward compatible resource element mapping, the downlink transmission during the control region.

17. The method of claim 16, wherein the indicator is included in a system information block message or a radio resource control message.

18. The method of claim 16, wherein the downlink transmission is associated with a machine-type communications physical downlink control channel or a physical downlink shared channel.

19. The method of claim 16, wherein the indicator identifies one or more symbols in the control region for the downlink transmission.

20. The method of claim 16, wherein the indicator includes two or more bitmaps,
wherein a first bitmap, of the two or more bitmaps, identifies a set of frequency domain resources using at least one of: a resource block granularity, a narrowband granularity, and wherein a second bitmap, of the two or more bitmaps, identifies a set of time domain resources of subframes associated with the control region.

21. The method of claim 16, wherein the downlink transmission is transmitted using at least one of:
a narrowband, of a set of narrowbands of the control region, configured by a bitmap,
a physical resource block, of a set of physical resource blocks of the control region, configured by the bitmap, or
a subframe, of a set of subframes associated with the control region, configured by the bitmap.

22. The method of claim 16, wherein the downlink transmission is transmitted using the control region of a subframe and a data region of the subframe and the backward compatible resource element mapping is performed on a frequency first, time second basis for the data region and then to the control region.

23. The method of claim 16, wherein the downlink transmission is transmitted using the control region of a subframe and a data region of the subframe and the backward compatible resource element mapping is performed using the data region and then repeating in-phase and quadrature (IQ) data of a subset of symbols of the data region to the control region.

24. The method of claim 23, wherein the subset of symbols is an initial subset of symbols of a second slot of the data region.

25. The method of claim 23, wherein the subset of symbols is another subset of symbols of a data region and the backward compatible resource element mapping includes puncturing one or more resource elements reserved for cell specific reference signals in the control region.

26. The method of claim 16, wherein resource element mapping is performed on at least one of a per radio network temporary identifier basis, a per search space basis, or a per channel type basis.

27. The method of claim 16, wherein the network entity is configured to receive a capability indication identifying a capability of the eMTC UE of receiving the downlink transmission in the control region, and
wherein the downlink transmission is transmitted based at least in part on receiving the capability indication.

28. The method of claim 16, wherein the backward compatible resource element mapping is a channel-specific resource element mapping.

29. The method of claim 16, wherein the backwards compatible resource element mapping is configured such that the downlink transmission is decodable using bits of a data region and without decoding bits of a control region.

30. The method of claim 16, wherein the backwards compatible resource element mapping is configured such that the downlink transmission is decodable using bits of a data region and bits of a control region.

31. An enhanced machine type communications (eMTC) user equipment (UE) for wireless communication, comprising:
a memory; and
one or more processors, coupled to the memory, configured to:
receive, via a system information block (SIB) type 1 (SIB-1), an indicator comprising a one-bit flag configured to indicate whether use of a control region of a Long Term Evolution (LTE) physical downlink control channel (PDCCH) for a downlink transmission is enabled or disabled; and receive, based at least in part on a backward compatible resource element mapping that is determined based at least in part on receiving the indicator, the downlink transmission during the control region.

32. The UE of claim 31, wherein the indicator is included in a system information block message or a radio resource control message.

33. The UE of claim 31, wherein the downlink transmission is associated with a machine-type communications physical downlink control channel or a physical downlink shared channel.

34. The UE of claim 31, wherein the indicator identifies one or more symbols in the control region for the downlink transmission.

35. A network entity for wireless communication, comprising:
   a memory; and
   one or more processors, coupled to the memory, configured to:
      transmit, via a system information block (SIB) type 1 (SIB-1) and for an enhanced machine-type communications (eMTC) user equipment (UE), an indicator comprising a one-bit flag configured to indicate whether use of a control region of a Long Term Evolution (LTE) physical downlink control channel (PDCCH) for a downlink transmission is enabled or disabled,
         wherein the indicator is associated with identifying a backward compatible resource element mapping for the downlink transmission; and
      transmit, based at least in part on transmitting the indicator and in accordance with the backward compatible resource element mapping, the downlink transmission during the control region.

36. The network entity of claim 35, wherein the indicator is included in a system information block message or a radio resource control message.

37. The network entity of claim 35, wherein the downlink transmission is associated with a machine-type communications physical downlink control channel or a physical downlink shared channel.

38. The network entity of claim 35, wherein the indicator identifies one or more symbols in the control region for the downlink transmission.

39. A non-transitory computer-readable medium storing one or more instructions for wireless communication, the one or more instructions comprising:
   one or more instructions that, when executed by one or more processors of an enhanced machine-type communications (eMTC) user equipment (UE), cause the one or more processors to:
      receive, via a system information block (SIB) type 1 (SIB-1), an indicator comprising a one-bit flag configured to indicate whether use of a control region of a Long Term Evolution (LTE) physical downlink control channel (PDCCH) for a downlink transmission is enabled or disabled; and
      receive, based at least in part on a backward compatible resource element mapping that is determined based at least in part on receiving the indicator, the downlink transmission during the control region.

40. The non-transitory computer-readable medium of claim 39, wherein the indicator is included in a system information block message or a radio resource control message.

41. The non-transitory computer-readable medium of claim 39, wherein the downlink transmission is associated with a machine-type communications physical downlink control channel or a physical downlink shared channel.

42. The non-transitory computer-readable medium of claim 39, wherein the indicator identifies one or more symbols in the control region for the downlink transmission.

43. A non-transitory computer-readable medium storing one or more instructions for wireless communication, the one or more instructions comprising:
   one or more instructions that, when executed by one or more processors of network entity, cause the one or more processors to:
      transmit, via a system information block (SIB) type 1 (SIB-1) and for an enhanced machine-type communications (eMTC) user equipment (UE), an indicator comprising a one-bit flag configured to indicate whether use of a control region of a Long Term Evolution (LTE) physical downlink control channel (PDCCH) for a downlink transmission is enabled or disabled to the eMTC UE,
         wherein the indicator is associated with identifying a backward compatible resource element mapping for the downlink transmission; and
      transmit, based at least in part on transmitting the indicator and in accordance with the backward compatible resource element mapping, the downlink transmission during the control region.

44. The non-transitory computer-readable medium of claim 43, wherein the indicator is included in a system information block message or a radio resource control message.

45. The non-transitory computer-readable medium of claim 43, wherein the downlink transmission is associated with a machine-type communications physical downlink control channel or a physical downlink shared channel.

46. An apparatus for wireless communication, comprising:
   means for receiving, via a system information block (SIB) type 1 (SIB-1), an indicator comprising a one-bit flag configured to indicate whether use of a control region of a Long Term Evolution (LTE) physical downlink control channel (PDCCH) for a downlink transmission is enabled or disabled; and
   means for receiving, based at least in part on a backward compatible resource element mapping that is determined based at least in part on receiving the indicator, the downlink transmission during the control region.

47. The apparatus of claim 46, wherein the indicator is included in a system information block message or a radio resource control message.

48. The apparatus of claim 46, wherein the downlink transmission is associated with a machine-type communications physical downlink control channel or a physical downlink shared channel.

49. An apparatus for wireless communication, comprising:
   means for transmitting, via a system information block (SIB) type 1 (SIB-1) and for an enhanced machine-type communications (eMTC) user equipment (UE), an indicator comprising a one-bit flag configured to indicate whether use of a control region of a Long Term Evolution (LTE) physical downlink control channel (PDCCH) for a downlink transmission is enabled or disabled,
      wherein the indicator is associated with identifying a backward compatible resource element mapping for the downlink transmission; and means for transmitting, based at least in part on transmitting the indicator and in accordance with the backward compatible resource element mapping, the downlink transmission during the control region.

50. The apparatus of claim 49, wherein the indicator is included in a system information block message or a radio resource control message.

\* \* \* \* \*